United States Patent
Karikomi

(12) 
(10) Patent No.: US 10,895,242 B2
(45) Date of Patent: Jan. 19, 2021

(54) OUTPUT REINFORCEMENT DEVICE OF POWER GENERATOR AND NATURAL ENERGY TYPE POWER GENERATOR

(71) Applicant: MITSUBISHI HEAVY INDUSTRIES, LTD., Tokyo (JP)

(72) Inventor: Kai Karikomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/279,012

(22) Filed: Feb. 19, 2019

(65) Prior Publication Data

US 2019/0301427 A1    Oct. 3, 2019

(30) Foreign Application Priority Data

Mar. 28, 2018   (JP) ................................. 2018-061792

(51) Int. Cl.
*F03D 1/06*    (2006.01)

(52) U.S. Cl.
CPC ........... *F03D 1/0608* (2013.01); *F03D 1/065* (2013.01); *F03D 1/0666* (2013.01)

(58) Field of Classification Search
CPC . F04D 29/326; F03D 1/00; F03D 1/06; F03D 1/0608; F03D 1/0625; F03D 1/065; F03D 1/0666; F03D 3/0436; F03D 3/0445; F03D 3/0454; F03D 3/0427
See application file for complete search history.

(56) References Cited

U.S. PATENT DOCUMENTS

| 4,863,350 A | 9/1989 | Quarterman |
| 6,756,696 B2 | 6/2004 | Ohya et al. |
| 6,951,443 B1 * | 10/2005 | Blakemore ............. F03D 15/00 415/4.3 |
| 7,939,961 B1 | 5/2011 | Bonnet |
| 8,308,437 B2 * | 11/2012 | Bagepalli ................ F03D 1/025 416/203 |
| 8,337,160 B2 * | 12/2012 | Uehara ..................... F01D 1/04 416/189 |

(Continued)

FOREIGN PATENT DOCUMENTS

| EP | 2 578 875 A1 | 4/2013 |
| GB | 213022 A | 3/1924 |
| WO | 03/081033 A1 | 10/2003 |

OTHER PUBLICATIONS

The Extended European Search Report dated Aug. 22, 2019, issued in counterpart EP Application No. 19157816.0. (7 pages).

(Continued)

*Primary Examiner* — Richard A Edgar
(74) *Attorney, Agent, or Firm* — Westerman, Hattori, Daniels & Adrian, LLP

(57) ABSTRACT

To enable an increase in a torque amount applied to a blade with simple and low-cost means in a natural energy type power generator. An output reinforcement device of a power generator according to an embodiment is an output reinforcement device of a power generator including a rotor that includes at least one blade driven by renewable energy and a hub attached with the blade, the output reinforcement device including a casing that has a tubular shape and disposed to surround the hub, the casing having a through-hole through which the blade is inserted and being configured to rotate together with the rotor.

9 Claims, 8 Drawing Sheets

(56) References Cited

U.S. PATENT DOCUMENTS

| | | | |
|---|---|---|---|
| 2006/0251516 A1 | 11/2006 | Sohn | |
| 2010/0135809 A1 | 6/2010 | Olschnegger | |
| 2011/0309625 A1* | 12/2011 | Dehlsen | F03D 1/0666 290/55 |
| 2012/0141250 A1* | 6/2012 | Kinzie | F03D 1/04 415/1 |

OTHER PUBLICATIONS

Office Action dated Jan. 28, 2020, issued in counterpart JP Application No. 2018-061792, with English translation. (6 pages).
Office Action dated May 28, 2020, issued in counterpart CN application No. 201910115415.6, with English Translation. (13 pages).
Office Action dated Jun. 15, 2020, issued in counterpart EP application No. 19157816.0. (6 pages).

\* cited by examiner

OUTPUT REINFORCEMENT DEVICE OF POWER GENERATOR AND NATURAL ENERGY TYPE POWER GENERATOR

TECHNICAL FIELD

This disclosure relates to an output reinforcement device of a power generator and a natural energy type power generator including the output reinforcement device.

BACKGROUND

In recent years, in wind power generation, a sufficient power generation effect has not been obtained in some cases because a wind direction and wind velocity change according to a setting place and weather conditions. Therefore, there has been proposed to accelerate wind hitting a blade and increase torque applied to the blade to thereby improve the power generation effect.

Patent Literature 1 discloses a configuration in which a tubular body that envelopes tip portions of a plurality of blades is provided and wind flowing into the tubular body is caused to hit the blades at an accelerated speed. In Patent Literature 2, a tubular body having a blade cross section is provided on a nacelle on a downstream side of a blade and wind flowing along the inner surface or the outer surface of the tubular body is accelerated to increase torque applied to the blade.

CITATION LIST

Patent Literature

Patent Document 1: WO 03/081033
Patent Document 2: European Patent Application Publication No. 2578875

SUMMARY

When an accelerating device disclosed in Patent Literature 1 is applied to a large wind power generator having a blade diameter exceeding 100 m, the accelerating device itself is increased in size. Therefore, in reality, it is difficult to set the accelerating device, and the cost of the accelerating device is high. Consequently, application of the accelerating device is limited to a small machine.

In an accelerating device disclosed in Patent Literature 2, since the tubular body is disposed away from the blade on the downstream side of the blade, an acceleration effect for the wind does not increase greatly near the blade. Therefore, the torque applied to the blade is not considered to increase much.

An object of an embodiment is to enable an increase in torque applied to a blade with simple and low-cost means in a national energy type power generator.

(1) An output reinforcement device of a power generator according to an embodiment is an output reinforcement device of a power generator including a rotor that includes at least one blade driven by renewable energy and a hub attached with the blade, the output reinforcement device including a casing that has a tubular shape and disposed to surround the hub, the casing having a through-hole through which the blade is inserted and being configured to rotate together with the rotor.

With the configuration of (1) described above, the output reinforcement device can be provided in a position closer to the hub side than a blade tip by inserting the blade through the through-hole formed in the casing of the output reinforcement device. Consequently, it is possible to reduce the diameter of the casing of the output reinforcement device. Therefore, it is possible to reduce the size and the cost of the output reinforcement device.

In order to increase the torque applied to the blade, it is effective to accelerate fluid, which is a natural energy source, near the blade front edge of the blade. With the configuration of (1) described above, the output reinforcement device can be provided in the same position as the blade with respect to a flowing direction of the fluid. Therefore, it is possible to accelerate the fluid near the blade front edge of the blade. Consequently, it is possible to efficiently increase the torque applied to the blade. Therefore, it is possible to improve an output of the power generator.

(2) In an embodiment, in the configuration of (1) described above, the casing is formed in an airfoil shape in which an outer surface of the casing has a back shape and an inner surface of the casing has a belly shape in a cross section of the casing taken along an axial direction thereof.

In general, flowing-in fluid is decelerated near a blade root portion. Therefore, torque applied to the blade decreases.

With the configuration of (2) described above, since the outer surface of the casing has the back shape, it is possible to accelerate the fluid along the outer surface of the casing. Consequently, it is possible to further increase the torque in an outer side region of the casing where torque originally received from the fluid is larger than in an inner side region. Therefore, even if the torque decreases in the inner side region of the casing, it is possible to increase the torque applied to the blade as a whole.

(3) In an embodiment, in the configuration of (1) or (2) described above, when a blade length direction length of the blade is represented as R and a distance between a rotation center of the blade and the casing is represented as r, the casing is disposed in a position satisfying a condition $0.05 \leq r/R \leq 0.25$.

With the configuration of (3) described above, a disposition position of the casing of the output reinforcement device satisfying the numerical value limitation range described above is a region from the outer side of the hub to the vicinity of the blade root portion in the blade length direction of the blade. This region is a region where the fluid flowing into the blade tends to be decelerated. By providing the output reinforcement device in the region, it is possible to increase flow velocity of the fluid in the region. Therefore, it is possible to increase the torque applied to the blade.

(4) In an embodiment, in the configuration of any one of (1) to (3) described above, when an axial direction length of the casing is represented as L, the through-hole is disposed in a position of 0.1 L or more and 0.8 L or less from a front end of the casing in an axial direction of the casing.

With the configuration of (4) described above, the through-hole is disposed in the position of 0.1 L or more and 0.8 L or less from the front end of the casing of the output reinforcement device. Therefore, it is possible to dispose the blade front edge of the blade in a region where the fluid is accelerated in the output reinforcement device. Consequently, it is possible to increase the torque applied to the blade.

(5) In an embodiment, in the configuration of any one of (1) to (4) described above, the output reinforcement device thither includes a column for supporting the casing on the hub.

With the configuration of (5) described above, it is possible to support the casing on the hub by the column. Consequently, it is possible to form structure in which the casing is not fixed to the blade. It is possible to provide a pitch angle control function in the blade. The pitch angle is an angle of the blade with respect to the fluid flowing into the blade. It is possible to control the pitch angle by turning the blade around a blade length direction center axis of the blade.

(6) In an embodiment, in the configuration of (5) described above, when a blade chord length of the blade is represented as c, a blade length direction length of the blade is represented as R, and a blade chord length ratio, which is a ratio of the blade chord length c and the blade length direction length R, is represented as c/R, the casing is provided in a position further on the hub side than a blade length direction position on the blade where the blade chord length ratio c/R has a maximum value.

With the configuration of (6) described above, the casing of the output reinforcement device is provided in the position further on the hub side than the position in the blade length direction where the blade chord length ratio c/R of the blade has the maximum value. Therefore, a region of the blade where the blade chord length c is relatively short is inserted into the through-hole. Therefore, it is possible to reduce the diameter of the through-hole even when the pitch angle control function is provided. Therefore, since a gap between the through-hole and the blade inserted into the through-hole can be narrowed, it is possible to suppress a leak of the fluid from the gap. Consequently, it is possible to maintain an acceleration effect for the fluid. Since the diameter of the through-hole can be reduced, it is possible to reduce a lower limit value of the axial direction length of the casing of the output reinforcement device.

(7) In an embodiment, in the configuration of (5) or (6) described above, when a maximum blade thickness in a cross section orthogonal to the blade length direction of the blade is represented as t and a blade chord length of the blade is represented as c, the casing is provided in a blade length direction position on the blade satisfying a condition $0.6 \leq t/c$.

The blade chord length c decreases and the maximum blade thickness t increases toward the blade root portion of the blade. With the configuration of (7) described above, the casing of the output reinforcement device is formed in a region near the blade root portion of the blade having a small blade chord length. Therefore, it is possible to reduce the diameter of the through-hole into which the blade is inserted. Consequently, even when the pitch angle control function is provided as explained above, it is possible to reduce a gap between the through-hole and the blade inserted through the through-hole. It is possible to suppress a leak of the fluid from the gap. Therefore, it is possible to maintain an acceleration effect for the fluid. While it is necessary to set the axial direction length of the casing of the output reinforcement device to the diameter of the through-hole or more, with the configuration of (7) described above, it is possible to reduce the diameter of the through-hole into which the blade is inserted. Therefore, it is possible to reduce a lower limit value of the axial direction length of the casing.

(8) In an embodiment, in the configuration of any one of (1) to (7) described above, the casing includes at least a first casing section and a second casing section.

The first casing section and the second casing section are coupled in a position traversing the through-hole.

With the configuration of (8) described above, since the casing is divided in the position traversing the through-hole, it is easy to assemble the casing in a state in which the blade is inserted into the through-hole.

(9) A natural energy type power generator according to an embodiment is a natural energy type power generator including a rotor that includes at least one blade driven by natural energy and a hub attached with the blade, the natural energy type power generator including the output reinforcement device having the configuration of any one of (1) to (8) described above.

With the configuration of (9) described above, the natural energy type power generator includes the output reinforcement device having the configuration described above. Therefore, since it is possible to reduce the size and the cost of the output reinforcement device and provide the output reinforcement device in the same position as the blade in the flowing direction of the fluid. Therefore, it is possible to improve an acceleration effect for the fluid near the blade front edge of the blade. Consequently, since the torque applied to the blade can be efficiently increased, it is possible to improve an output of the power generator.

(10) In an embodiment, in the configuration of (9) described above, the blade is configured to be driven by wind power energy.

With the configuration of (10) described above, by applying the output reinforcement device having the configuration described above to a wind power generator, it is possible to reduce the size and the cost of the output reinforcement device provided in the rotor and efficiently increase the torque applied to the blade with the wind power energy. Therefore, it is possible to improve an output of the power generator.

According to the several embodiments, it is possible to reduce the size and the cost of the output reinforcement device, efficiently increase the torque applied to the blade, and improve an output of the power generator.

DETAILED DESCRIPTION

Several embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Expression representing relative or absolute disposition such as "in a certain direction", "along a certain direction", "parallel", "orthogonal", "center", "concentric", and "coaxial" not only strictly represent such displacement but also represent a state of relative displacement with a tolerance or an angle or a distance in a degree in which the same function can be obtained.

Expressions representing an equal state of matters such as "same", "equal", and "homogeneous" not only strictly represent the equal state but also represent a state in which a tolerance or a difference in a degree in which the same function can be obtained is present.

Expressions representing shapes such as a square shape and a cylindrical shape not only represent shapes such as a square shape and a cylindrical shape in a geometrically strict sense but also represent shapes including an uneven section and a chambered section in a range in which the same effect is obtained.

On the other hand, expressions "provided with", "equipped with", "furnished with", "including", and "having" one constituent element are not exclusive expressions that exclude presence of other constituent elements.

Figure 1:
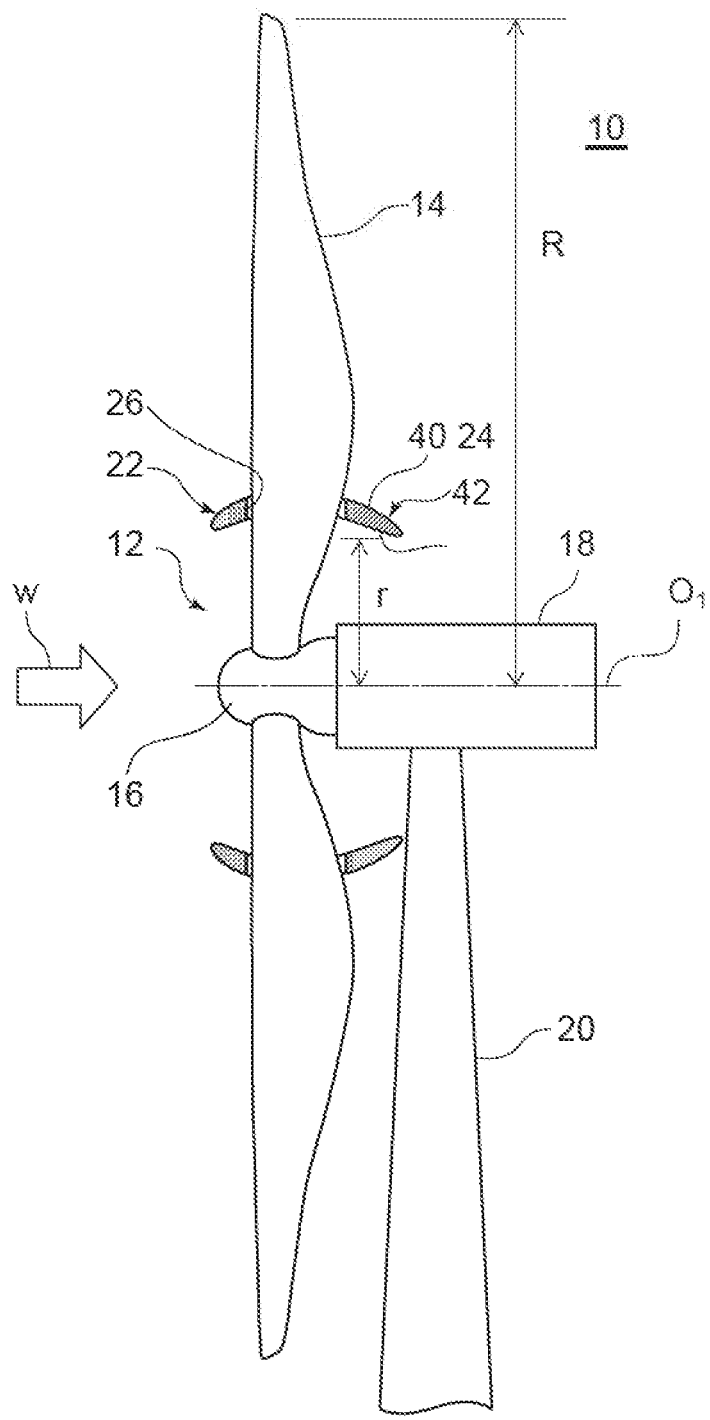
FIG. 1 is a side view of a wind power generator according to an embodiment.
Figure 2:
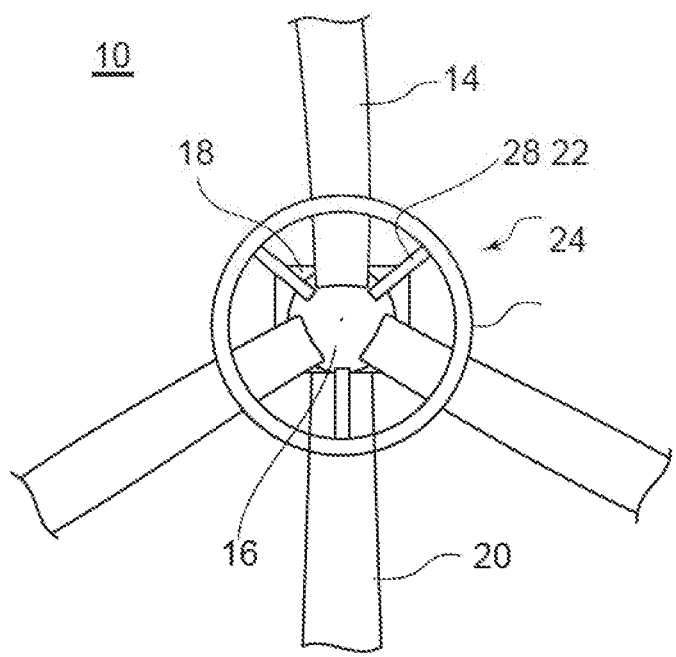
FIG. 2 is a front view of the wind power generator according to the embodiment.

FIG. 1 and FIG. 2 are a side view and a front view schematically showing a wind power generator 10 according to an embodiment.

In FIGS. 1 and 2, the wind power generator 10 includes a rotor 12 that includes at least one blade 14 and a hub 16 attached with the blade 14. The rotor 12 is driven to rotate with wind power energy of wind w flowing into the blade 14. The hub 16 is rotatably supported by a nacelle 18 set at the top of a tower 20. The nacelle 18 houses, on the inside thereof, a transmission (not shown in FIGS. 1 and 2) that transmits rotation of the rotor 12 to a generator (not shown in FIGS. 1 and 2) and the generator driven by the rotation of the rotor 12 to generate electric power.

The wind power generator 10 further includes an output reinforcement device 22. The output reinforcement device 22 includes a tubular casing 24 disposed to surround the hub 16. The casing 24 has a through-hole 26 through which the blade 14 is inserted. The casing 24 rotates together with the rotor 12 in a state in which the blade 14 is inserted through the through-hole 26.

In FIG. 1, for convenience, only the output reinforcement device 22 is shown in a cross section.

By inserting the blade 14 through the through-hole 26, as shown in FIGS. 1 and 2, the output reinforcement device 22 is provided in a position crossing the blade 14. That is, the output reinforcement device 22 can be provided in a position closer to the hub side than the blade tip in a blade length direction of the blade 14. Therefore, the casing 24 can be reduced in a diameter. Consequently, it is possible to reduce the size and the cost of the output reinforcement device 22. Since the output reinforcement device 22 can be provided in the same position as the blade 14 with respect to a flowing direction of the wind w, it is possible to improve an acceleration effect for the wind w near the blade front edge of the blade 14. Consequently, it is possible to efficiently increase torque applied to the blade 14. Therefore, it is possible to improve an output of a generator.

In an embodiment, as shown in FIGS. 1 and 2, the casing 24 is disposed such that the axial direction of the casing 24 extends along a rotation center axis $O_1$ of the blade 14. Consequently, it is possible to efficiently accelerate the wind w flowing in along the rotation center axis $O_1$. Further, it is also possible to accelerate the wind w flowing into the casing 24 at an angle inclined with respect to the rotation center axis $O_1$.

In an embodiment, as shown in FIG. 2, the output reinforcement device 22 includes columns 28 for supporting the casing 24 on the hub 16. The casing 24 is fixed to the hub 16 via the columns 28.

According to this embodiment, the output reinforcement device 22 is supported on the hub 16 by the columns 28 and is not fixed to the blade 14. Therefore, the blade 14 can have a pitch angle control function.

Figure 3:
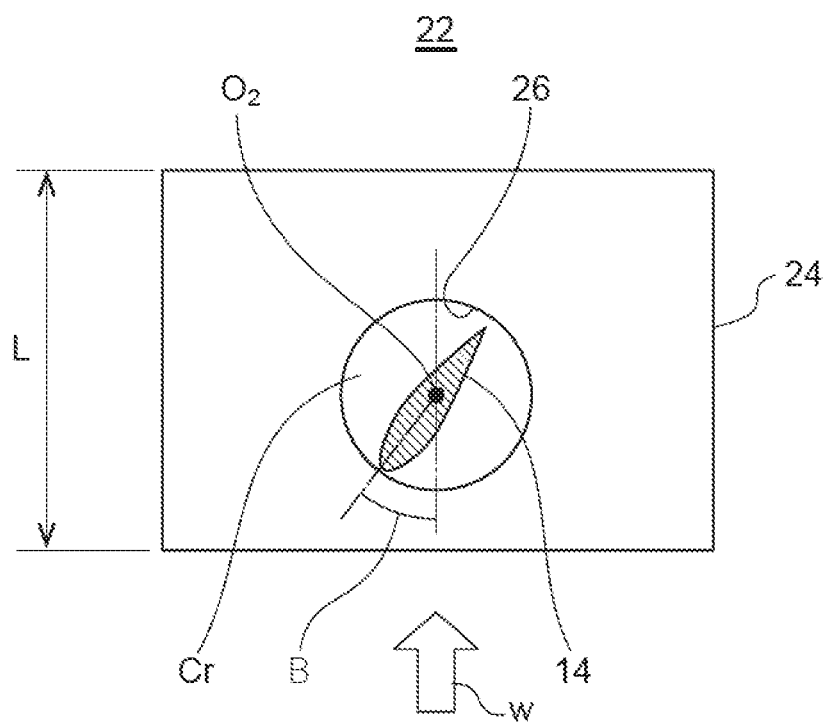
FIG. 3 is a plan view of an output reinforcement device according to an embodiment.

As shown in FIG. 3, a pitch angle θ is an angle of the blade 14 with respect to the wind w. It is possible to control the pitch angle θ by turning the blade 14 around a blade length direction rotation axis $O_2$ of the blade 14. It is possible to simplify and reduce the cost of a supporting configuration for the casing 24 by supporting the casing 24 with the columns 28. In this embodiment, the blade 14 is inserted through the through-hole 26 with a gap Cr.

As in the embodiment explained above, when it is possible to control the pitch angle of the blade 14 inserted through the through-hole 26, the through-hole 26 needs to be formed as a circular through-hole having a diameter larger than a blade chord length c (see FIG. 10) of the blade 14 inserted into the through-hole 26. An axial direction length L of the casing 24 needs to be set longer than the blade chord length c of the blade 14 inserted into the through-hole 26.

In an embodiment, the cross section of the column 28 can be formed in an airfoil shape. Consequently, it is possible to suppress turbulence of the wind w flowing into the inner side of the casing 24, and therefore, it is possible to maintain the acceleration effect for the wind w flowing into the inner side of the casing 24.

In an embodiment, the casing 24 is fixed to the blade 14. According to this embodiment, since the casing 24 is directly fixed to the blade 14, the output reinforcement device 22 is capable of rotating together with the rotor 12. A supporting member such as the columns 28 is unnecessary to attach the output reinforcement device 22. It is possible to further reduce the cost than in the embodiment shown in FIGS. 1 and 2. However, in this embodiment, the blade 14 cannot have the pitch angle control function.

In several embodiments, when the casing 24 is visually recognized from the axial direction, the casing 24 may be formed in a circular shape or may be formed in an elliptical shape. In another embodiment, the casing 24 may be formed in, for example, a triangular shape, a square shape, or a polygonal shape such as a hexagonal shape. If the casing 24 is formed in the polygonal shape, it is easy to manufacture the casing 24 compared with the circular shape, the elliptical shape, and the like.

Figure 4:
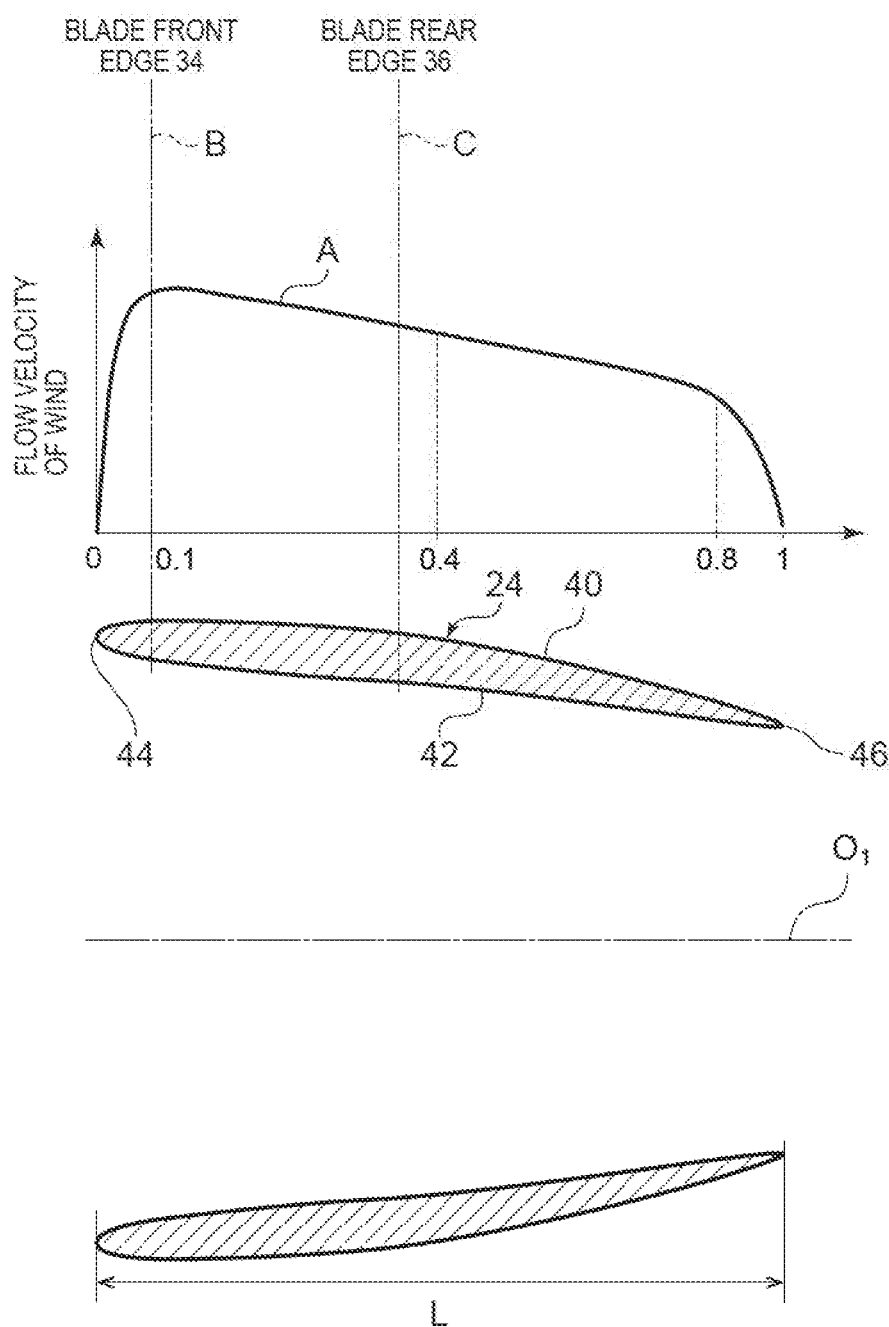
FIG. 4 is a diagram showing an example of a wind velocity profile in the axial direction of the output reinforcement device according to the embodiment.

In an embodiment, as shown in FIGS. 1 and 4, the casing 24 is formed in an airfoil shape in which an outer surface 40 of the casing 24 has a back shape and an inner surface 42 of the casing 24 has a belly shape in the cross section of the casing 24 taken along the axial direction thereof.

According to this embodiment, since the outer surface 40 of the casing 24 has the back shape, it is possible to accelerate the wind w flowing along the outer surface 40 of the casing 24. Consequently, it is possible to further accelerate the wind w in an outer side region of the casing 24 that originally receives larger torque from the wind w than an inner side region. Therefore, it is possible to increase the torque applied to the blade 14. Even if the torque decreases in the inner side region of the casing 24, it is possible to increase the torque applied to the blade 14 as a whole.

FIG. 4 shows a flow velocity profile of the wind w in the axial direction of the casing 24.

In FIG. 4, the horizontal axis indicates a dimensionless value with the position of a front end 44 of the casing 24 set as 0 and the position of a rear end 46 of the casing 24 set as 1. The vertical axis indicates flow velocity of the wind w. In FIG. 4, a line A indicates flow velocity of the wind w flowing along the outer surface 40 of the casing 24 of the output reinforcement device 22. A line B indicates the position of a blade front edge 34 of the blade 14 in the axial direction of the casing 24. A line C indicates the position of a blade rear edge 36 of the blade 14.

In an embodiment, when the axial direction length of the casing 24 is represented as L, the through-hole 26 is disposed in a position of 0.1 L to 0.8 L from the front end of the casing 24 in the axial direction of the casing 24.

According to this embodiment, the through-hole 26 is disposed in the position of 0.1 L to 0.8 L, from the front end of the casing 24. Therefore, it is possible to dispose the blade front edge of the blade 14 in a region where the wind w is accelerated by the output reinforcement device 22. Consequently, it is possible to increase the torque applied to the blade 14. It is possible to most efficiently increase the torque received by the blade 14 by increasing the flow velocity of the wind w flowing into the blade front edge of the blade 14.

In view of a flow velocity distribution of the line A shown in FIG. 4, it is desirable to dispose the through-hole 26 in a position of 0.1 L to 0.4 L from the front end of the casing 24.

Figure 10:
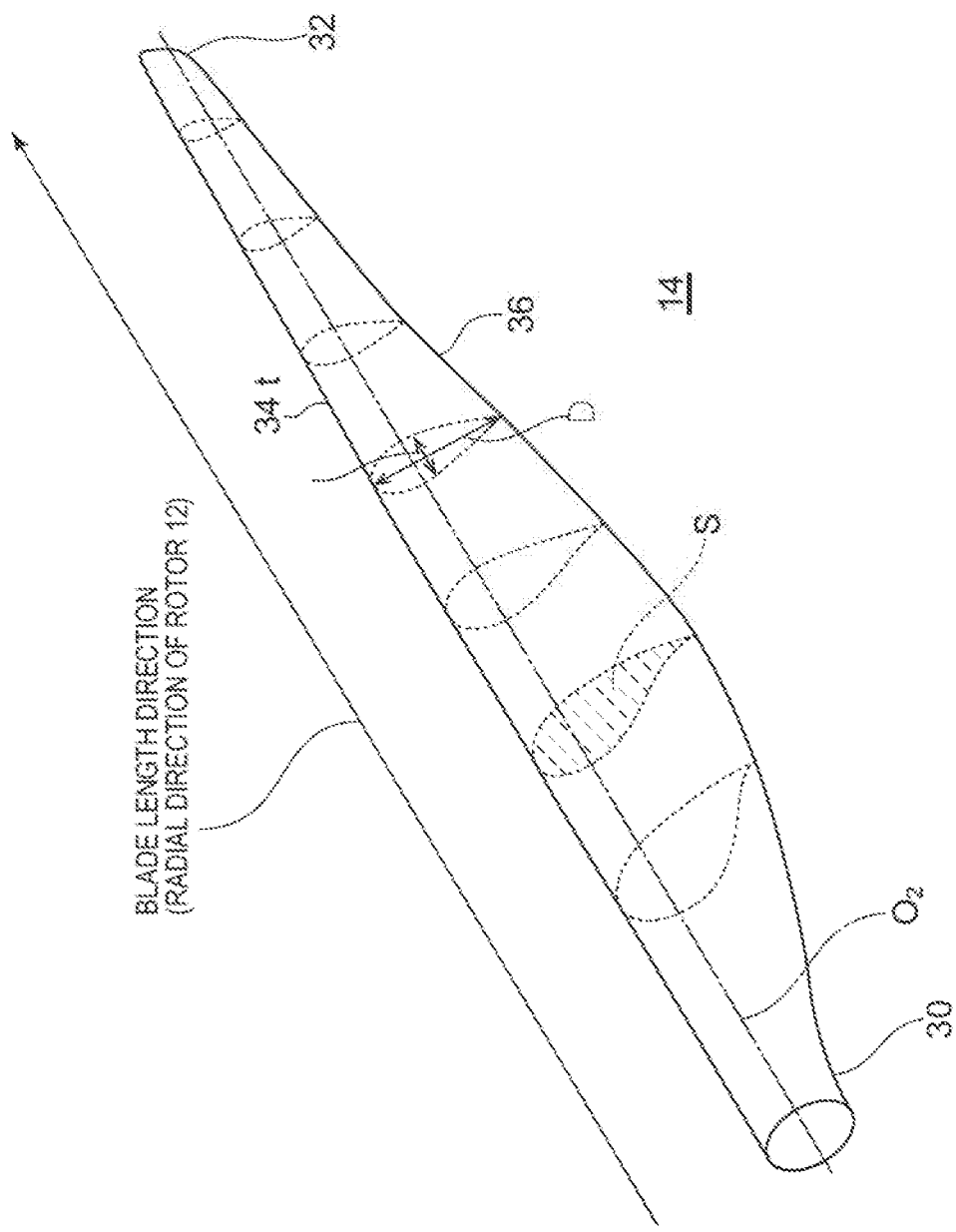
FIG. 10 is a perspective view showing an example of the shape of the blade.

FIG. 10 shows an example of the shape of the blade 14. In FIG. 10, a blade root portion 30 has a cross section similar to a column in order to increase strength. From the blade root portion 30 to a blade end portion 32, the blade chord length c is increased in order to increase resistance against the wind w to increase a torque amount. In a blade end side region where peripheral speed by rotation is increases, conversely, the blade chord length c is reduced in order to reduce the resistance of the wind w. A maximum blade thickness t in a cross section S orthogonal to the blade length direction also changes from the blade root portion 30 to the blade end portion 32. In FIG. 10, reference numeral 34 denotes the blade front edge of the blade 14 and reference numeral 36 denotes the blade rear edge of the blade 14.

Figure 11:
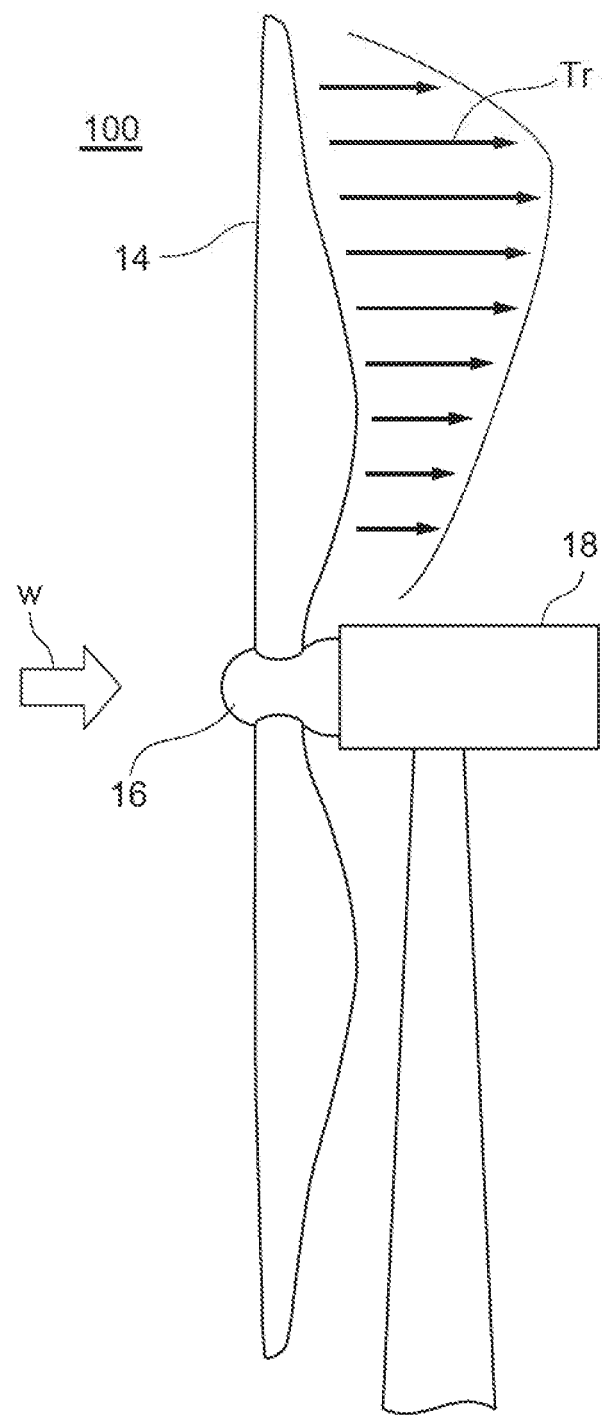
FIG. 11 is an explanatory diagram showing an example of a distribution of the torque applied to the blade.

FIG. 11 is a diagram showing torque received by the blade 14 from the wind w. A value of the torque received from the flowing-in wind w is small in the blade root portion Where the blade chord length c is small and the peripheral speed by the rotation is also small.

In an embodiment, when the blade length direction length of the blade 14 (the radius of the rotor 12) is represented as R and the distance between the rotation center axis $O_1$ of the blade 14 and the casing 24 is represented as r, the casing 24 is disposed in a position satisfying a condition $0.05 \leq r/R \leq 0.25$.

According to this embodiment, a position of the casing 24 satisfying the numerical value limitation range is a region from the outer side of the hub 16 to the vicinity of the blade root portion in the blade length direction of the blade 14. This region is a region where the wind w flowing into the blade 14 tends to be decelerated. By providing the output reinforcement device 22 in the region, it is possible to increase flow velocity of the wind w in the region. Therefore, it is possible to increase the torque applied to the blade 14.

Figure 5:
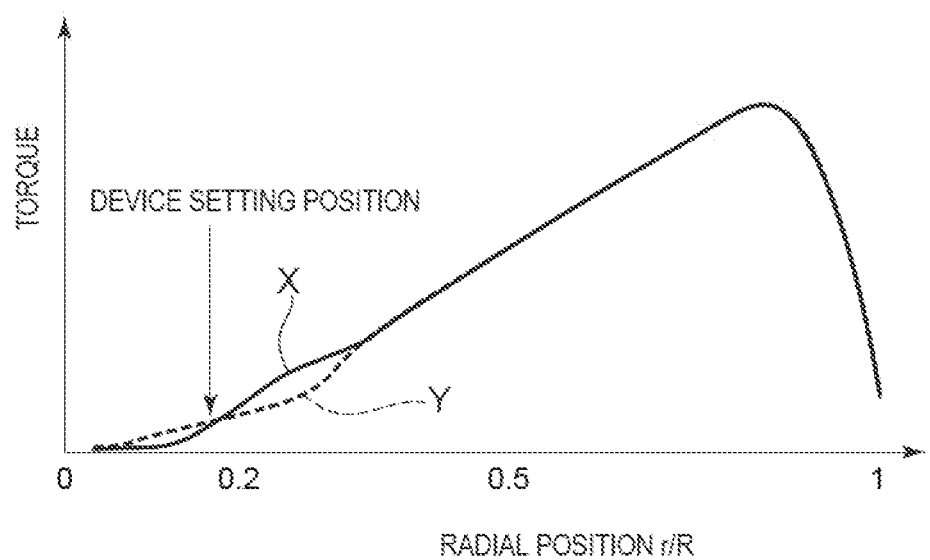
FIG. 5 is a diagram showing a distribution in a blade length direction of a blade of torque applied to the blade.

FIG. 5 shows a distribution of torque received from the wind w flowing into the blade 14 in the blade length direction of the blade 14.

In FIG. 5, a line X indicates torque received by the blade 14 when the output reinforcement device 22 is provided. A line Y indicates torque received by the blade 14 when the output reinforcement device 22 is not provided. In this experiment, as shown in FIGS. 1 and 4, the output reinforcement device formed in the airfoil shape in which the outer surface 40 of the casing 24 has the back shape and the inner surface 42 of the casing 24 has the belly shape, is used.

As it is seen from FIG. 5, when the output reinforcement device 22 having the configuration explained above is used, compared with when the output reinforcement device 22 is not used, the wind w flowing into the rotor 12 along the outer surface 40 of casing 24 is accelerated. The wind w flowing into the rotor 12 along the inner surface 42 of the casing 24 is decelerated. In the inner side region of the casing 24 close to the blade root portion 30, since the flow velocity of the wind w is originally small, the influence due to the setting of the output reinforcement device is small. Therefore, it is possible to increase torque received by the blade 14 as a whole by providing the output reinforcement device 22.

The casing 24 is desirably disposed in a position satisfying a condition $0.1 \leq r/R \leq 0.2$. Consequently, it is possible to further accelerate the wind w flowing into the rotor 12 along the outer surface 40 and further increase the torque received by the blade 14.

Figure 6:
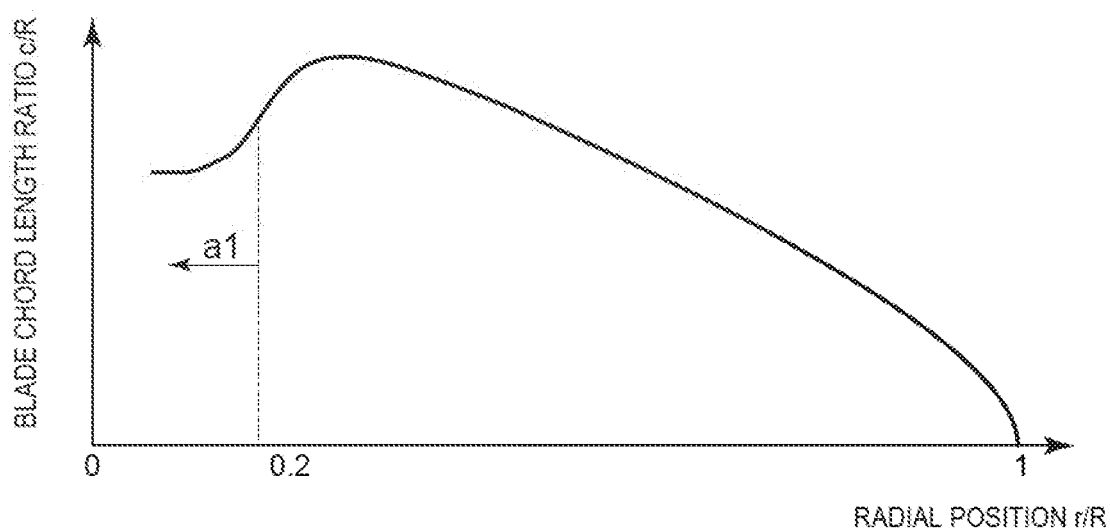
FIG. 6 is a diagram showing a distribution in the blade length direction of the blade of a blade chord length of the blade.

FIG. 6 is a diagram showing an example of a relation between the radial position r/R and the blade chord length ratio c/R of the blade 14. The blade chord length ratio c/R represents the blade chord length c as a dimensionless amount. As shown in FIG. 6, in the blade 14, since strength is required in the blade root portion, the blade chord length ratio c/R decreases.

In an embodiment, the output reinforcement device 22 is provided in a position further on the hub side than a position where the blade chord length ratio c/R of the blade 14 has a maximum value in the blade length direction of the blade 14. Consequently a region of the blade 14 where the blade chord length c is small is inserted into the through-hole 26. Therefore, even when pitch angle control of the blade 14 is enabled, it is possible to reduce the diameter of the through-hole 26. Therefore, since the gap Cr (see FIG. 3) between the through-hole 26 and the blade 14 inserted through the through-hole 26 can be reduced, it is possible to suppress a leak of the wind w from the gap Cr. Therefore, it is possible to maintain the acceleration effect for the wind w. Since the diameter of the through-hole 26 can be reduced, it is possible to reduce a lower limit value of the axial direction length of the output reinforcement device 22.

In FIG. 6, a region a1 indicates an example of a region where the output reinforcement device 22 is provided. It is possible to obtain the operational effects explained above by providing the output reinforcement device 22 in the region a1.

Figure 7:
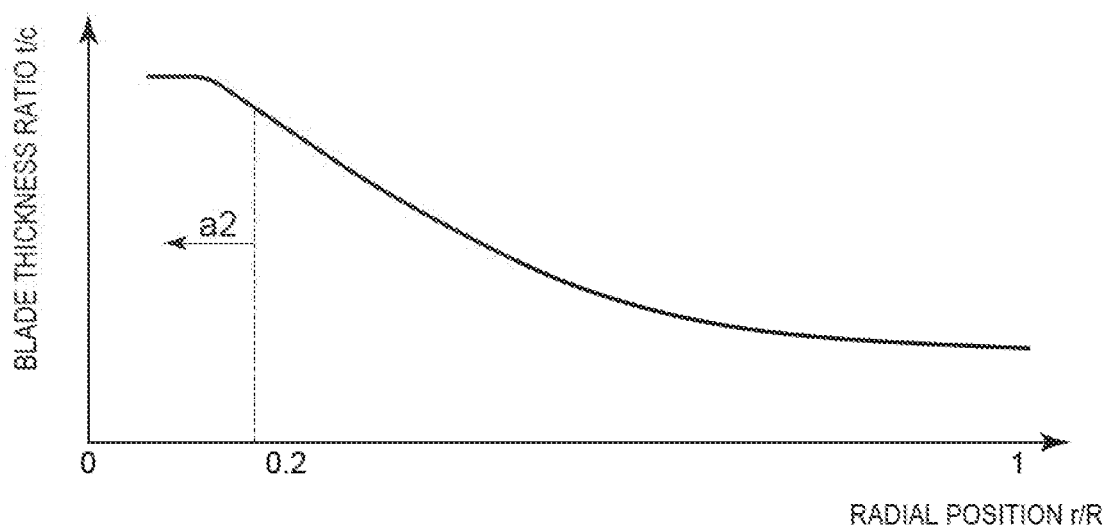
FIG. 7 is a diagram showing a distribution in the blade length direction of the blade of a blade thickness ratio of the blade.

FIG. 7 is a diagram showing an example of a relation between the radial position r/R and the blade thickness ratio t/c of the blade 14. As shown in FIG. 7, in the blade root portion, the cross section of the blade 14 is formed in a substantially circular shape in order to increase strength. Therefore, the blade thickness ratio t/c is nearly 100%. In a region where the blade thickness ratio t/c exceeds 50, aerodynamic performance of the blade 14 is not good and the wind w is not accelerated much. Therefore, torque received from the wind w flowing into the blade 14 is not large.

Therefore, in an embodiment, the output reinforcement device 22 is provided in a blade length direction position on the blade 14 satisfying a condition $0.6 \leq t/c$.

Consequently, it is possible to improve the aerodynamic performance of the region where the aerodynamic performance in the blade length direction of the blade 14 is not good. Since the blade chord length c in the region is small, it is possible to reduce the diameter of the through-hole 26 formed in the casing 24. Further, by reducing the diameter of the through-hole 26, it is possible to reduce the gap Cr between the through-hole 26 and the blade 14 inserted through the through-hole 26 and reduce a leak of the wind w from the gap Cr. Therefore, it is possible to maintain the acceleration effect for the wind w and reduce the lower limit value of the axial direction length of the output reinforcement device 22.

The output reinforcement device 22 is desirably provided in a blade length direction position on the blade 14 satisfying a condition 0.6≤t/c≤0.7. Consequently, it is possible to improve the aerodynamic performance of the region where the aerodynamic performance is not good. It is possible to increase the torque applied to the blade 14.

In FIG. 7, a region a2 indicates an example of a region where the output reinforcement device 22 is provided. By providing the output reinforcement device 22 in the region a2, it is possible to obtain the operational effects explained above.

Figure 8:
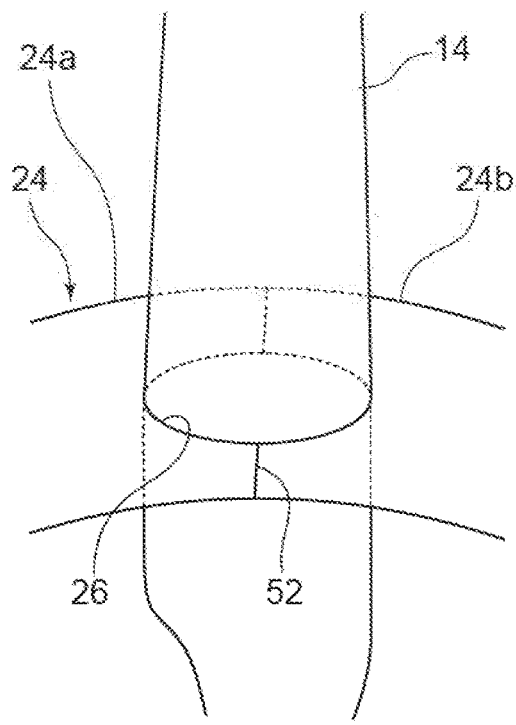
FIG. 8 is a perspective view showing a casing of the output reinforcement device according to the embodiment.
Figure 9:
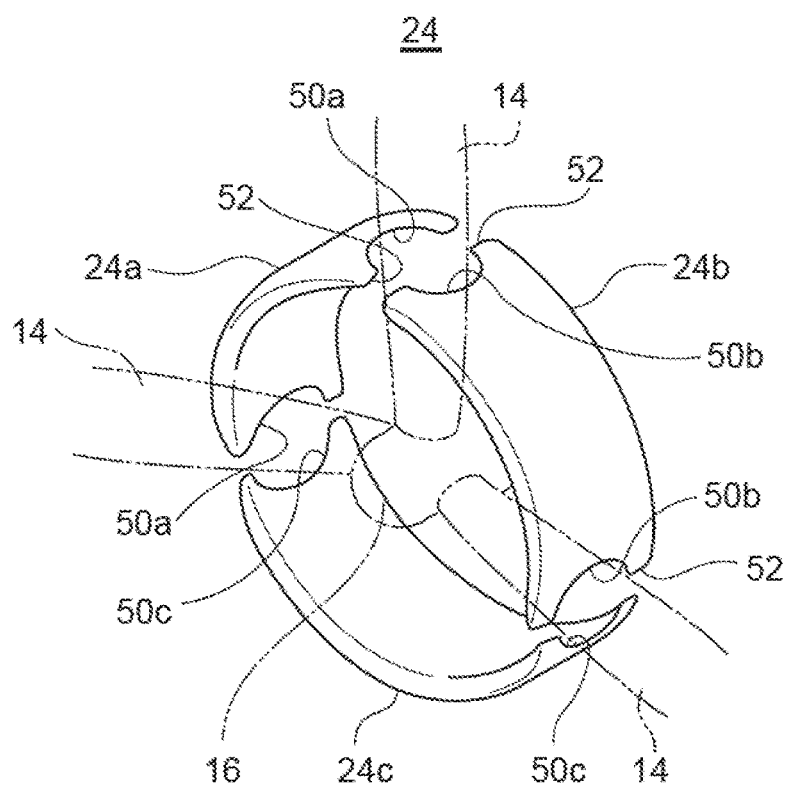
FIG. 9 is a perspective view showing the casing of the output reinforcement device according to the embodiment.

In an embodiment, as shown in FIGS. 8 and 9, the casing 24 of the output reinforcement device 22 at least includes a first casing piece 24a and a second casing piece 24b. The first casing piece 24a and the second casing piece 24b are coupled in a position traversing the through-hole 26.

According to this embodiment, the casing 24 is divided in the position traversing the through-hole 26. Therefore, it is easy to assemble the casing 24 in a state in which the blade 14 is inserted into the through-hole 26.

In an embodiment, as short in FIGS. 8 and 9, when the first casing piece 24a and a second casing piece 24b are assembled, end faces 52 of the first casing piece 24a and a second casing piece 24b are disposed in the position traversing the through-hole 26. The end faces 52 of the first casing piece 24a and a second casing piece 24b are coupled.

In an embodiment, the casing 24 includes the first casing piece 24a and the second easing piece 24b. The casing 24 includes casing pieces as many as the blades 14. The easing pieces are assembled by coupling the end faces 52 of the casing pieces in positions traversing the through-holes 26.

In an embodiment, as shown in FIG. 2, three blades 14 are provided at equal intervals in the circumferential direction of the hub 16. As shown in FIG. 9, the casing 24 is configured by three casing pieces 24a, 24b, and 24c equally divided in the circumferential direction. Semicircular recessed sections 50a, 50b, and 50c are respectively formed at both ends of the casing pieces 24a to 24c. When the casing pieces 24a to 24c are assembled, while respectively holding the three blades 14 with the recessed sections 50a to 50c, the end faces 52 formed on both sides of the recessed sections 50a, 50b, and 50c are abutted and joined by means such as welding.

Consequently, it is possible to easily assemble the casing 24.

As explained above, the wind power generator 10 includes the output reinforcement device 22 according to the several embodiments. Therefore, it is possible to reduce the size and the cost of the output reinforcement device 22 itself. It is possible to provide the output reinforcement device 22 in the same position as the blade 14 in the flowing direction of the wind w. Therefore, it is possible to improve the acceleration effect for the wind w near the blade front edge of the blade 14. Consequently, it is possible to efficiently increase the torque applied to the blade 14. Therefore, it is possible to improve an output of the power generator.

All of the embodiments are embodiments applied to the wind power generator. However, several embodiments are applicable to other natural energy type power generators. The embodiments can also be applied to, for example, tidal current power generation for performing power generation using tidal currents as a natural energy source and ocean current power generation for performing power generation using ocean currents as a natural energy source.

INDUSTRIAL APPLICABILITY

According to the several embodiments, in the natural energy type power generator, it is possible to increase, with simple and low-cost means, torque applied to the blade by natural energy. Consequently, it is possible to improve power generation efficiency.

The invention claimed is:

1. A natural energy type power generator, comprising:
a rotor that includes at least one blade driven by renewable energy and a hub attached with the blade, and
an output reinforcement device configured to be installed with the rotor,
wherein the output reinforcement device comprises a casing that has a tubular shape and is configured to surround the hub, the casing having a through-hole through which the blade is configured to be inserted, the casing being configured to rotate together with the rotor, and
wherein the casing is formed in an airfoil shape in which an outer surface of the casing has a back shape and an inner surface of the casing has a belly shape in a cross section of the casing taken along an axial direction thereof, and
wherein the blade is continuous from a radial inside of the output reinforcement device to a radial outside thereof.

2. The natural energy type power generator according to claim 1, wherein, when an axial direction length of the casing is represented as L, the through-hole is disposed in a position of 0.1 L or more and 0.8 L or less from a front end of the casing in an axial direction of the casing.

3. The natural energy type power generator according to claim 1, further comprising a column configured to support the casing on the hub.

4. The natural energy type power generator according to claim 1,
wherein the casing includes at least a first casing section and a second casing section, and
wherein the first casing section and the second casing section are coupled in a position traversing the through-hole.

5. The natural energy type power generator according to claim 1, wherein the blade is configured to be driven by wind power energy.

6. The natural energy type power generator according to claim 1, wherein, when a blade length direction length of the blade is represented as R and a distance between a rotation center of the blade and the casing is represented as r, the casing is disposed in a position satisfying a condition 0.05 r/R 0.25.

7. The natural energy type power generator according to claim 1, wherein, when a blade chord length of the blade is represented as c, a blade length direction length of the blade is represented as R, and a blade chord length ratio, which is a ratio of the blade chord length c and the blade length direction length R, is represented as c/R, the casing is provided in a position further on the hub side than a blade length direction position on the blade where the blade chord length ratio c/R has a maximum value.

8. The natural energy type power generator according to claim 1, wherein, when a maximum blade thickness in a cross section orthogonal to the blade length direction of the blade is represented as t and a blade chord length of the blade is represented as c, the casing is provided in a blade length direction position on the blade satisfying a condition 0.6 t/c.

9. An output reinforcement device configured to be installed in a power generator including a rotor that includes at least one blade driven by renewable energy and a hub attached with the blade, the output reinforcement device comprising:
- a casing that has a tubular shape and is configured to surround the hub, the casing having a through-hole through which the blade is configured to be inserted, the casing being configured to rotate together with the rotor, and
- wherein the casing is formed in an airfoil shape in which an outer surface of the casing has a back shape and an inner surface of the casing has a belly shape in a cross section of the casing taken along an axial direction thereof,
- wherein the blade is continuous from a radial inside of the output reinforcement device to a radial outside thereof,
- wherein the casing includes at least a first casing section and a second casing section, and
- wherein the first casing section and the second casing section are coupled in a position traversing the through-hole.

* * * * *